(12) United States Patent
Kapteyn et al.

(10) Patent No.: US 11,150,139 B2
(45) Date of Patent: Oct. 19, 2021

(54) APPARATUS AND METHODS FOR FULL SPATIO-TEMPORAL CHARACTERIZATION OF ULTRASHORT LIGHT PULSES

(71) Applicant: Kapteyn Murnane Laboratories, Inc., Boulder, CO (US)

(72) Inventors: Henry C. Kapteyn, Boulder, CO (US); Daniel E. Adams, Thornton, CO (US); Seth L. Cousin, Boulder, CO (US)

(73) Assignee: Kapteyn Murnane Laboratories, Inc., Boulder, CO (US)

( * ) Notice: Subject to any disclaimer, the term of this patent is extended or adjusted under 35 U.S.C. 154(b) by 0 days.

(21) Appl. No.: 16/820,645

(22) Filed: Mar. 16, 2020

(65) Prior Publication Data
US 2020/0292393 A1    Sep. 17, 2020

Related U.S. Application Data

(60) Provisional application No. 62/818,878, filed on Mar. 15, 2019.

(51) Int. Cl.
*G01J 11/00* (2006.01)
(52) U.S. Cl.
CPC .................. *G01J 11/00* (2013.01)
(58) Field of Classification Search
CPC .................................................. G01J 11/00
See application file for complete search history.

(56) References Cited

U.S. PATENT DOCUMENTS

| | | | | |
|---|---|---|---|---|
| 5,754,292 A | * | 5/1998 | Kane | G01J 11/00 356/450 |
| 6,052,180 A | * | 4/2000 | Neal | G01J 9/00 250/201.9 |
| 6,611,336 B1 | * | 8/2003 | Walmsley | G01J 11/00 356/450 |
| 2006/0088259 A1 | * | 4/2006 | Weiner | G01J 11/00 385/122 |
| 2016/0109298 A1 | * | 4/2016 | Durfee | G01J 9/0215 356/451 |
| 2017/0205292 A1 | * | 7/2017 | Quere | G01J 3/453 |

OTHER PUBLICATIONS

Cousin, Seth L. et al. "Three-dimensional spatiotemporal pulse characterization with an acousto-optic pulse shaper and a Hartmann-Shack wavefront sensor". Optics Letters, vol. 37, No. 15, Aug. 1, 2012, pp. 3291-3293. (Year: 2012).*

* cited by examiner

*Primary Examiner* — Michael A Lyons
(74) *Attorney, Agent, or Firm* — Macheledt Bales LLP; Jennifer L. Bales

(57) ABSTRACT

Apparatus and methods of full spatio-temporal characterization of ultrashort pulses from an input pulse-beam source. An interferometer system generates a first, second, third, and fourth replica of the input pulse-beam such that the second replica has a varying delay with respect to the first replica and the fourth replica has a varying delay with respect to the third replica. A reference plane is imaged onto a nonlinear spectral measurement device based upon the first and second replicas, and the reference plane is also imaged onto a wavefront sensitive (WFS) imaging element based on the third and fourth replicas. The signals from the WFS imaging element and the spectral signal are used to compute a pulse temporal spectral profile of the input pulse-beam.

14 Claims, 3 Drawing Sheets

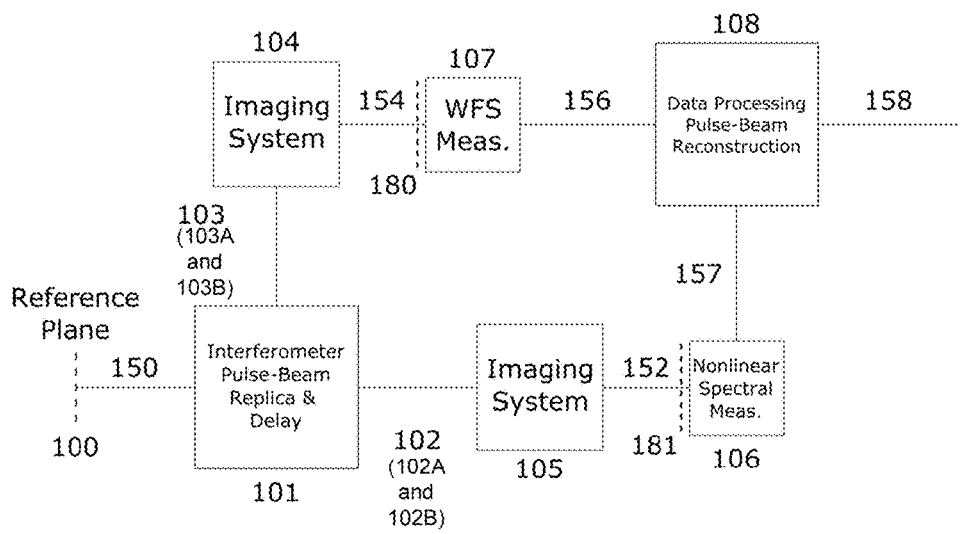
Figure 1
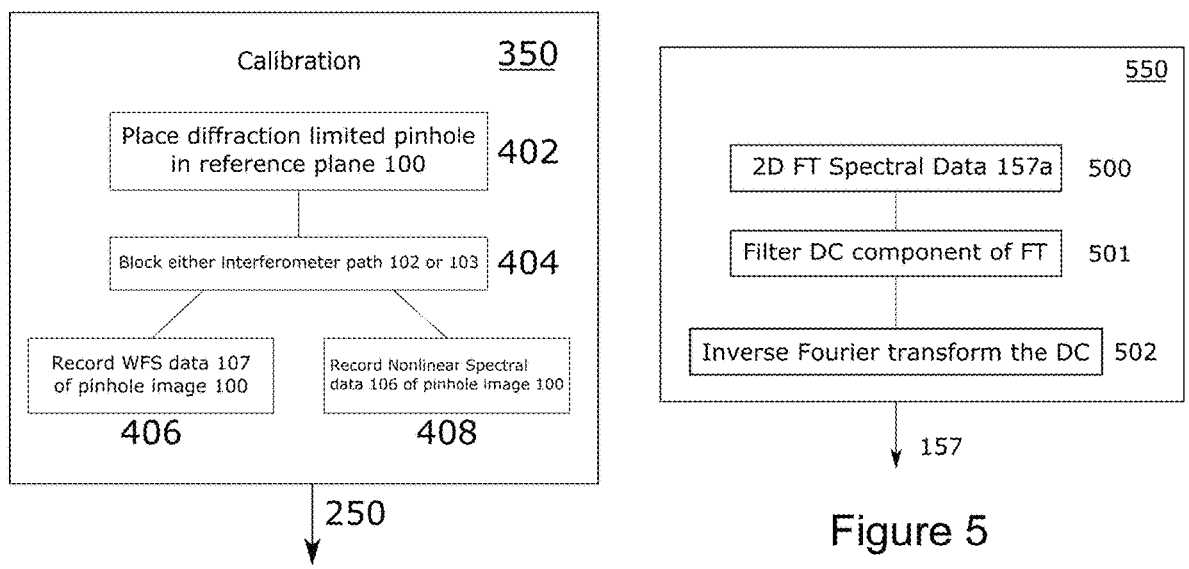
Figure 4
Figure 5

APPARATUS AND METHODS FOR FULL SPATIO-TEMPORAL CHARACTERIZATION OF ULTRASHORT LIGHT PULSES

This invention was made with government support under grant number FA9550-18-1-0089 awarded by the U.S. Air Force. The government has certain rights in the invention.

FIELD OF THE INVENTION

The present invention relates to apparatus and methods for full spatio-temporal characterization of ultrashort light pulses. In particular, the present invention relates to FISH-FROG (Femtosecond Interferometric Shack-Hartmann Frequency Resolved Optical Gating) full spatiotemporal measurement devices.

DISCUSSION OF RELATED ART

There is increasing evidence that current broadly-used ultrafast pulse measurement techniques present an incomplete characterization of a laser pulse that can lead to spurious experimental results. Specifically, the use of ultrafast laser pulses with duration <<100 fs is increasingly routine in studies, for example, of pulse filamentation, ultrafast micromachining and high-harmonic generation. These studies, to be valid, require exquisite control over both the temporal and spatial profiles of ultrashort pulses (10 s of picoseconds or shorter). Specifically, commercial laser pulse characterization devices typically separately measure the spatial and temporal profiles; e.g. an M2 measurement combined with a FROG (see R. Trebino and D. J. Kane, "Using phase retrieval to measure the intensity and phase of ultrashort pulses: frequency-resolved optical gating," J. Opt. Soc. Am. A 10, 1101 (1993)) or SPIDER (C. Iaconis and I. A. a Walmsley, "Spectral phase interferometry for direct electric-field reconstruction of ultrashort optical pulses." Opt. Lett. 23, 792-4 (1998)) pulse characterization. Often, this is presumed to provide a complete characterization of the output of an ultrafast laser. However, even simple optical systems such as prisms, gratings, and short focal-length lenses can imprint complex spatiotemporal distortions. These issues are well known to ultrafast pulse experts; however, spatiotemporal characterization techniques developed to-date have been complex to implement—experiments in themselves, not self-referenced and not routinely employed to ensure the integrity of experimental results. There is a critical need for an easy-to-use apparatus that provides a reliable full spatiotemporal characterization of an ultrafast pulse, particularly in a reliable self-referencing manner that inherently provides cross checks such as the "frequency marginal" such as in FROG.

SUMMARY OF THE INVENTION

An optical system makes an exact replica of the signal field to be measured and also serves to produce a time delay between the two fields. The replica and original signal field are simultaneously imaged to both 1) a wave-front sensitive device (WFS) and 2) a device sensitive to the temporal phase and amplitude at one spatial position.

Apparatus and methods of full spatio-temporal characterization of ultrashort pulses according to the present invention provide an input pulse-beam source of ultrashort pulses to be characterized. An interferometer system generates a first, second, third, and fourth replica of the input pulse-beam such that the second replica has a varying delay with respect to the first replica and the fourth replica has a varying delay with respect to the third replica. A spectral measurement path includes a spectral-measurement-path imaging element and a nonlinear spectral measurement device, and a wavefront sensitive (WFS) path including a WFS imaging element and a WFS measurement device.

The spectral-measurement-path imaging element images a reference plane at the nonlinear spectral measurement device based upon the first and second replicas and the WFS imaging element images the reference plane at the WFS measurement device based upon the third and fourth replicas.

The WFS measurement device generates a WFS signal based upon the imaged reference plane at the WFS measurement device. The the nonlinear spectral measurement device generates a spectral signal based upon the imaged reference plane at the nonlinear spectral measurement device;

A processor receives the WFS signal and the spectral signal and computes a pulse temporal spectral profile of the input pulse-beam.

The WFS measurement device may be a Shack-Hartman wavefront sensor or a lateral shearing interferometer.

In preferred embodiments, the interferometer system utilizes a single interferometer to generate all of the replicas and vary the delay among them. The interferometer may be a Mach-Zehnder interferometer.

A calibration process blocks either the spectral measurement path or the wavefront sensitive path and records WFS and spectral data of a fiducial image at the reference plane. The fiducial image may be a pinhole or other aperture.

BRIEF DESCRIPTION OF THE DRAWINGS

FIG. 1 is a high-level block diagram of the FISHFROG device according to the present invention.

FIG. 4 is a flow diagram illustrating a calibration process performed on the FISHFROG device of FIG. 1-3.

FIG. 5 is a flow diagram illustrating the colinear FROG process

DETAILED DESCRIPTION OF THE INVENTION

Figure 2:
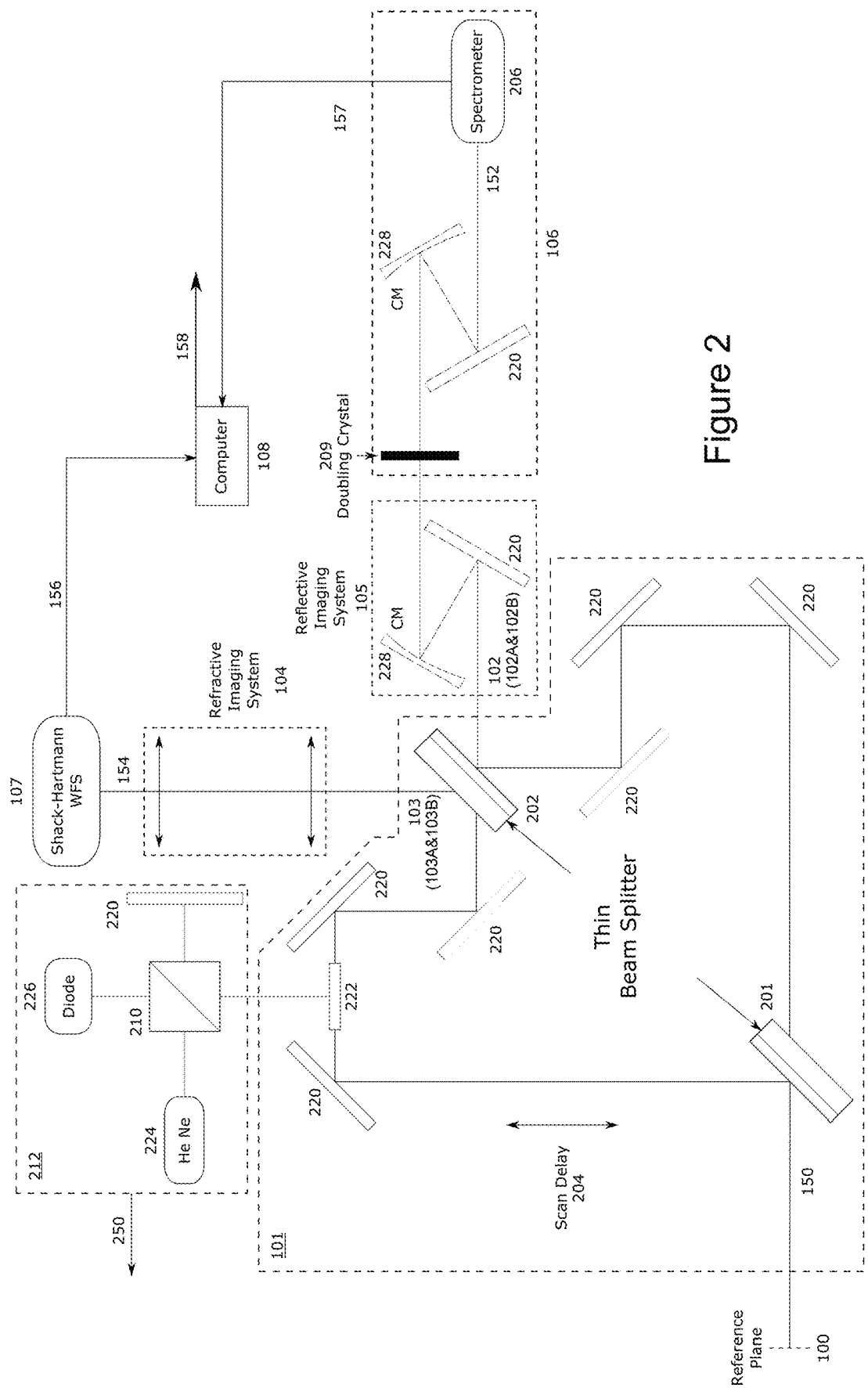
FIG. 2 is a more detailed block diagram showing a preferred embodiment of the FISHFROG device of FIG. 1.

Table 1 lists elements of the present invention and their associated reference numbers.

TABLE 1

| Ref. No. | Element |
| --- | --- |
| 100 | Reference plane |
| 101 | Interferometer system |
| 102 | Pulses to spectral path - two replicas of input pulse 150 with one replica 102A variably delayed with respect to the other replica 102B |
| 103 | Pulses to WFS path - two replicas of input pulse 150 with one replica 103A variably delayed with respect to the other replica 103B |
| 104 | WFS path imaging system |
| 105 | Spectral path imaging system |
| 106 | Spectral measurement device |
| 107 | WFS measurement system |

TABLE 1-continued

| Ref. No. | Element |
|---|---|
| 108 | Processor |
| 150 | Input pulses |
| 152 | Signal provided to spectral measurement system |
| 154 | Signal provided to WFS measurement system |
| 156 | WFS measurements |
| 157 | Spectral measurements |
| 158 | Output - pulse temporal (spectral) profile for one spatial position |
| 201 | Beam splitter |
| 202 | Beam splitter |
| 204 | Variable delay |
| 209 | Doubling crystal |
| 210 | Beam splitter |
| 212 | Time delay calibration device |
| 220 | Reflective surfaces |
| 222 | Scan mirror |
| 224 | HeNe laser |
| 226 | Diode to record time delay calibration signal |
| 228 | Curved mirrors |
| 250 | Calibration signal |
| 302 | Repeat WFS processing for each delay |
| 304 | Repeat spectral processing for each delay |
| 308 | Fourier transform to frequency |
| 310 | Fourier transformed signal |
| 312 | Reconstruct spatial phase for each frequency |
| 314 | Reconstructed spatial phase for each frequency |
| 320 | Reconstruct spectral phase for one spatial position |
| 322 | Reconstructed spectral phase for one spatial position |
| 324 | Combine spatial and spectral reconstructions |
| 326 | 3D (2xSpace 1xDelay) Combined spatial and spectral reconstructions |
| 328 | Fourier transform to time |
| 402 | Place diffraction limited pinhole in plane 100 |
| 404 | Block either path 102 or path 104 |
| 406 | Record WFS data 107 of image of pinhole 100 |
| 408 | Record spectral data 108 of image of pinhole 100 |
| 500 | 2D Fourier transform spectral data 157a |
| 501 | Filter DC component |
| 502 | Inverse Fourier transform the DC |
| 550 | Process for co-linear FROG |

The present invention is a setup that elegantly combines spatial and temporal measurement in a single scanning setup as easy to use as an M2, FROG, or SPIDER setup while providing full pulse-beam characterization information. A preferred embodiment of the present invention, termed FISHFROG (Femtosecond Interferometric Shack-Hartmann Frequency Resolved Optical Gating) combines three devices: 1) a Mach-Zehnder interferometer that splits the incident pulse-beam in amplitude and recombines the copies at two, balanced outputs, 2) a collinear FROG (cFROG) at one output of the interferometer, referenced to a specific point at the wavefront, and 3) a Shack-Hartmann wavefront sensor.

The interferometer provides a variable delay between the spatiotemporal copies so that a Shack-Hartmann trace and a frequency-doubled spectrum can be recorded for each temporal scan position. The Shack-Hartmann images are then Fourier transformed from time to frequency. The cFROG trace (i.e. the frequency doubled spectrum as a function of delay) is processed to obtain a temporal characterization of the pulse at one position within the profile. The frequency dependent Shack-Hartmann traces provide the wavefront amplitude and phase for each frequency component across the beam profile (i.e. the spatio-spectrally resolved amplitude and phase), while the cFROG measurement provides the spectral phase and amplitude (spectrum) for one spatial position in the beam.

The cFROG data can be Fourier transformed into the time domain to provide the temporal profile of the pulse, at the position within the profile sampled by the CFROG. However, the Shack-Hartmann data provide relative spatial and spectral phase across the entire beam profile. By combining these two data sets, a full complex spatio-spectral characterization of the pulse is obtained. These data can then be Fourier transformed back into the time-domain to provide a full spatio-temporal characterization.

FIG. 1 is a high-level block diagram illustrating the FISHFROG invention. An interferometer system 101 produces exact spatiotemporal replicas 102, 103 of an input signal field. The replicas consist of pairs of two collinear spatiotemporal fields 102A, 102B and 103A, 103B. One output pair 103A, 103B of the interferometer is imaged through an imaging system 104 to a wavefront sensitive device 107 and another output pair 102A, 102B of the interferometer is imaged through an imaging system 105 to a spectral measurement device 106.

The interferometer system 101 provides a variable delay between 102A and 102B and between 103A and 103B, while the wavefront sensitive device 107 and spectral measurement device 106 collect signals 154, 152 at each delay. In processor 108, the compilation of wavefront sensitive measurements 156, 157 is numerically, Fourier transformed across delay to frequency where frequency dependent wavefronts are numerically calculated (see FIG. 3). The compilation of pulse sensitive, spectral measurements is numerically processed to provide the pulse, temporal (spectral) profile 158 for one spatial position.

Imaging systems 104 and 105 relay a plane 100 upstream of the device to both measurement devices 106 and 107. A calibration process 350 (see FIG. 4) places an aperture in the reference plane 100 that is imaged to the input of both measurement devices 106 and 107, co-locates the wavefront and pulse measurements. After the wavefront data and pulse profile data have been processed, a final step consists of assigning the spectral (temporal) phase measured by the spectral measurement device 106 to one spatial location in the wavefront data, using the calibration process.

Processor 108 provides full information of the input electric field through a compilation of space and frequency dependent wavefront measurements that are correctly phased in spectrum by the temporal (spectral) measurement at one spatial location.

FIG. 2 is a more detailed block diagram of an embodiment of a FISHFROG device of FIG. 1. The preferred embodiment of the FISHFROG device shown in FIG. 2 consists of a Mach-Zehnder interferometer 101. The interferometer consists of two thin, low-dispersion, high wavefront quality plate beam splitters 201 and 202. A delay stage placed in one arm of the interferometer 101 provides temporal 204 delay. The interferometer makes four copies of the input beam 150. Two collinear copies 103A, 103B are imaged, through a 4f imaging system 104 to a Shack-Hartmann wavefront sensor 107 leaving no residual spatial phase at the input of WFS 107. Two collinear copies 102A, 102B of the input beam 150 are imaged through a reflective imaging system 105, focused through a nonlinear, doubling crystal 209 to the input of a spectral measuring device 106. The reflective imaging system 105 imparts no temporal dispersion onto the copies 102A, 102B. The interferometer system 101 produces a variable delay 204 between 102A and 102B and between 103A and 103B (by scanning mirror 222 along with the mirrors to the right and left of 222). The Shack-Hartmann device 107 collects a spot-field image for each delay point of the temporal scan. The spectrometer 106 collects a frequency doubled 209 spectra for each delay point of the temporal scan. A time delay calibration device 212 ensures that the delay axis 204 is either 1) stepped in a purely linear fashion, or 2) can be interpolated to be linear in post processing. In the preferred embodiment, the calibration device 212 consists of a Michelson interferometer using a beam splitter 210 and a single frequency laser 224 such as a Helium-Neon laser operating on a narrow transition. Diode 226 records time delay calibration signal. The calibration device could also be an encoded delay stage in one arm of the Mach-Zehnder interferometer.

The compilation of delay-dependent spot-field images 154 collected by the Shack-Hartmann device 107 are first interpolated onto a linear delay axis provided by the delay calibration device 212, and then Fourier transformed pixel-wise, along the delay direction. The resulting array is three-dimensional and has axes (x, y, ω) or (space, space, frequency) and represents a monochromatic spot-field image for each frequency in the input spectrum. Each spot-field image is then processed yielding the spatial phase and amplitude for each frequency component in the input spectrum.

The compilation of delay-dependent, frequency-doubled spectra are first interpolated onto a linear delay axis provided by the delay calibration device 212, and then are processed yielding a second harmonic frequency resolved optical gaiting trace that is further processed providing the temporal amplitude and phase of the input pulse for one spatial position.

A one-time calibration process 350 (see FIG. 4) consisting of placing a diffraction limited aperture in a reference plane 100 that is imaged to both measurement devices 106 and 107, co-locates the pulse profile measurement with the frequency-dependent spatial wavefront measurements. After the calibration process 350 is complete, one spatial point in the compilation of frequency-dependent wavefront measurements is assigned the spectral phase calculated using measurements from 106.

The resulting three-dimensional array represents the input field in the coordinates (x, y, ω) which can then be Fourier transformed along the frequency axis to coordinates (x, y, t).

Figure 3:
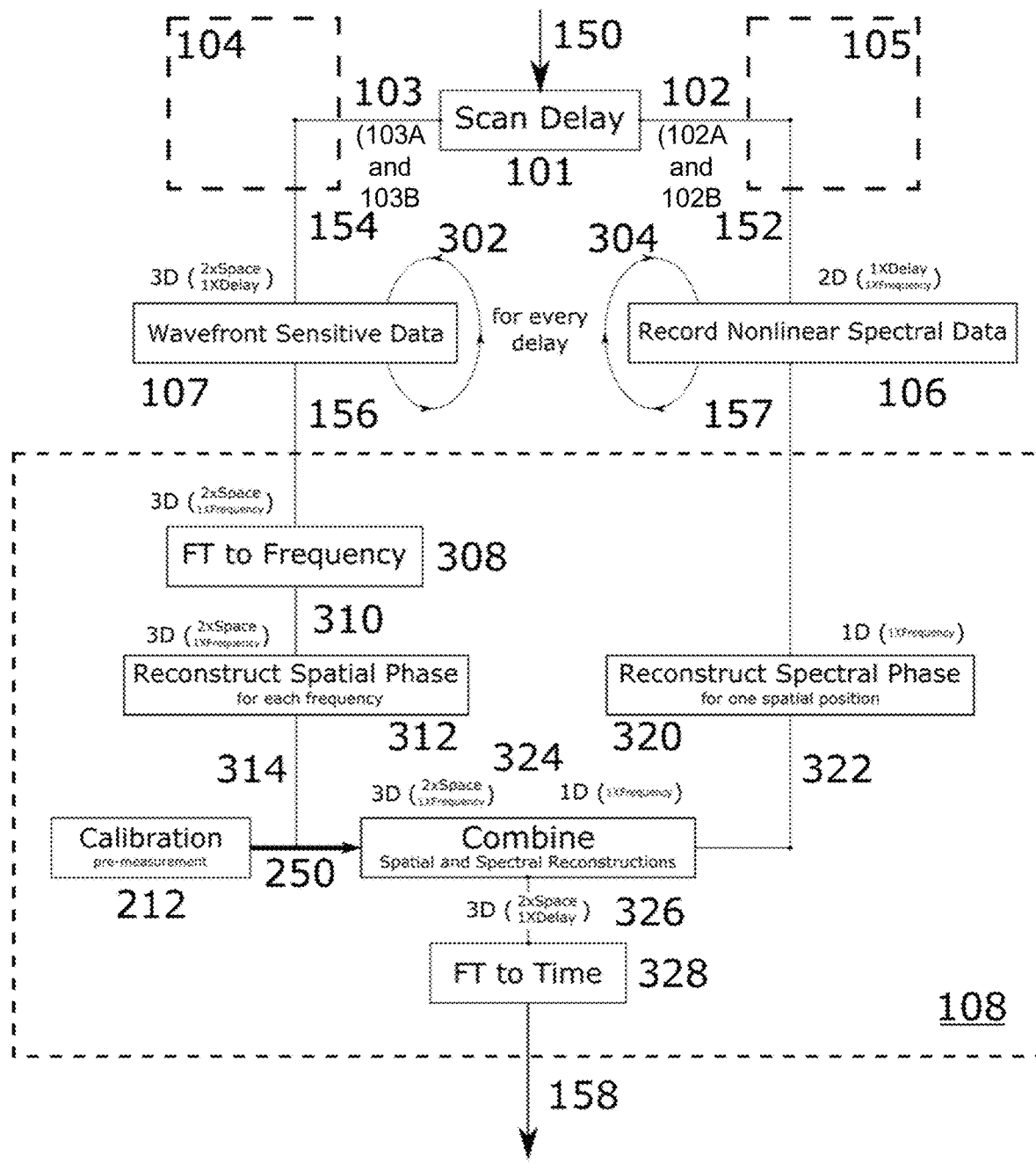
FIG. 3 is a flow diagram illustrating a method performed according to the FISHFROG device of FIGS. 1 and 2.

FIG. 3 is a flow diagram illustrating the data collection, combination, and reconstruction process for the FISHFROG device of FIGS. 1 and 2. FIG. 3 describes the process to collect data from input radiation pulses 150, combine the spatial and spectral measurements 156, 157, and reconstruct the spatiotemporal pulse-beam profile 158. The delay between identical pulse-beams 102A, 102B and 103A, 103B is scanned within interferometer 101 while both spatial, wavefront sensitive data 156 and spectral data 157 are collected. The spatial data 156 is Fourier transformed 308 along the delay axis to temporal frequency 310 where the spatial amplitude and phase are reconstructed in step 312 for all nonzero temporal frequency components. The spectral data 157 provide a reconstruction 320 for the spectral phase and amplitude for one spatial position. The complex spatial and spectral reconstructions are combined 324 to form the full spatiospectral profile of the pulse-beam. The spatiospectral profile is Fourier transformed 328 along the temporal frequency axis to time, yielding the full spatiotemporal profile of the pulse-beam.

FIG. 4 is a flow diagram illustrating the one-time calibration process 350. A pinhole is placed 402 in the reference plane 100 and one path of the interferometer, either 102 or 103, is blocked. As an alternative another fiducial image may be used from the same section of the beam. Reference WFS data 107 and spectral data 106 are recorded in steps 406 and 408. The spectral phase at the spatial position in the WFS data 156 is then set directly to the spectral phase 322 reconstructed from measurements of the spectral data 157.

FIG. 5 is a flow diagram illustrating the co-linear FROG process 550. The version of FROG used by embodiments of the present invention is collinear (cFrog) rather than non-collinear, so there is an additional data processing step.

The collinear FROG-trace data processing includes:

Step 500: Fourier transform the co-linear FROG-trace in both dimensions

Step 501: Filter the collinear FROG-trace in the 2D Fourier domain, keeping the DC component of the trace. This is usually accomplished with a top-hat or super Gaussian filter Step 502: Inverse Fourier transform the DC component of the trace yielding what amounts to a non-collinear FROG-trace.

The above data illustrate the capability of the FISHFROG technique to obtain a full spatio-spectral and spatio-temporal characterization of an ultrashort-pulse beam using very simple apparatus. The combination of the Shack-Hartmann and the interferometer provides a simple way of obtaining spectrum and spectral phase information across an entire beam profile. By using the same interferometer for the FROG characterization, at a specifically referenced point, a full data set is obtained. Furthermore, the technique provides multiple opportunities for gathering redundant data to ensure that the data form a self-consistent data set. For example, rather than referencing the FROG and S-H data sets to a single point, an imaging spectrometer can be used to provide full temporal characterization of the beam along one dimension. The consistency between S-H measured relative phase, and the FROG measured phase, can be compared. Measuring the fundamental as well as the second harmonic of the beam, either at one point (using a simple spectrometer) or along a 1-D profile (using an imaging spectrometer), provides a cross-reference check with the S-H Fourier transform data. All these measurements provide further confidence in the measurement, in particular in reference to issues such as common "pedestal" or ASE (amplified spontaneous emission) issues in an ultrafast beam. The pedestal is a low-intensity, in some cases incoherent, background that does not contribute to the peak focusable intensity of the beam but will show-up in spectral and power measurements.

While the exemplary preferred embodiments of the present invention are described herein with particularity, those skilled in the art will appreciate various changes, additions, and applications other than those specifically mentioned, which are within the spirit of this invention. For example, although FISHFROG obtains a full beam characterization in a compact configuration with a minimal number of components, further variations of the apparatus are possible. Other beam profile measurement techniques, such as the lateral shearing interferometers, or even ptychographic reconstruction (i.e. beam profile measured at 2 or more points along propagation, along with phase retrieval) can be combined with the Fourier transform interferometer to obtain spectrally-resolved amplitude and phase data. Variations in the interferometer can be employed (i.e. Michelson, Mach-Zehnder, etc). A non-collinear FROG setup, or even a SPIDER-type nonlinear pulse measurement technique, can be substituted for cFROG. Other new techniques such as a dispersion scan (d-SCAN) or MIIPS can be used. Further, for example, two points within the profile can be cross-correlated through non-collinear XFROG or similar that can provide two pulse profile reference points. Apertures or masks within the interferometer can allow for partial blocking within one or another beam of the interferometer, for example to allow this XFROG measurement in a simple non-collinear, non-interferometric mode at two or more points, with adjacent points providing the interferometer information.

What is claimed is:

1. Apparatus for full spatio-temporal characterization of ultrashort pulses comprising:
    an input pulse-beam source of ultrashort pulses;
    an interferometer system configured to generate a first, second, third, and fourth replica of the input pulse-beam such that the second replica has a varying delay with respect to the first replica and the fourth replica has a varying delay with respect to the third replica;
    a spectral measurement path including a spectral-measurement-path imaging element and a nonlinear spectral measurement device;
    a wavefront sensitive (WFS) path including a WFS imaging element and a WFS measurement device; and
    a processor;
    wherein the apparatus is configured such that the spectral-measurement-path imaging element images a reference plane at the nonlinear spectral measurement device based upon the first and second replicas;
    wherein the WFS imaging element images the reference plane at the WFS measurement device based upon the third and fourth replicas;
    wherein the WFS measurement device generates a WFS signal based upon the imaged reference plane at the WFS measurement device;
    wherein the nonlinear spectral measurement device generates a spectral signal based upon the imaged reference plane at the nonlinear spectral measurement device; and
    wherein the processor is configured to receive the WFS signal and the spectral signal and to compute a pulse temporal spectral profile of the input pulse-beam.

2. The apparatus of claim 1 wherein the WFS measurement device is a Shack-Hartman wavefront sensor.

3. The apparatus of claim 1 wherein the WFS measurement device is a lateral shearing interferometer.

4. The apparatus of claim 1 wherein the interferometer system includes a single interferometer configured to generate all of the replicas and vary the delay among them.

5. The apparatus of claim 4 wherein the interferometer is a Mach-Zehnder interferometer.

6. The apparatus of claim 1 further comprising a calibration mechanism configured to block either the spectral measurement path or the wavefront sensitive path with either a diffraction limited aperture or a mask and to record WFS and spectral data of a fiducial image at the reference plane.

7. The apparatus of claim 1 wherein the nonlinear spectral measurement device comprises a nonlinear crystal and a spectrometer, the spectrometer configured to sample the spectral measurement path.

8. A method of fully spatio-temporally characterizing ultrashort pulses comprising the steps of:
    providing an input pulse-beam of ultrashort pulses;
    generating a first, second, third, and fourth replica of the input pulse-beam such that the second replica has a varying delay with respect to the first replica and the fourth replica has a varying delay with respect to the third replica;
    providing a nonlinear spectral measurement device;
    imaging a reference plane at the nonlinear spectral measurement device based upon the first and second replicas;
    generating a spectral signal with the nonlinear spectral measurement device based upon the imaged reference plane at the nonlinear spectral measurement device providing a wavefront sensitive (WFS) imaging element;
    imaging the reference plane at a WFS measurement device based upon the third and fourth replicas;
    generating a WFS signal with the WFS measurement device based upon the imaged reference plane at the WFS measurement device; and
    receiving the WFS signal and the spectral signal and computing a pulse temporal spectral profile of the input pulse-beam.

9. The method of claim 8 wherein the WFS measurement device is a Shack-Hartman wavefront sensor.

10. The method of claim 8 wherein the WFS measurement device is a lateral shearing interferometer.

11. The method of claim 8 wherein the step of generating a first, second, third, and fourth replica utilizes a single interferometer to generate all of the replicas and vary the delay among them.

12. The method of claim 11 wherein the interferometer is a Mach-Zehnder interferometer.

13. The method of claim 8 further comprising a calibration process including the steps of blocking either the first and second replicas or the third and fourth replicas and recording WFS and spectral data of a fiducial image at the reference plane.

14. The method of claim 13 further comprising the steps of unblocking the replicas blocked in claim 13, blocking the remaining replicas, and recording WFS and spectral data of a fiducial image at the reference plane.

* * * * *